(12) United States Patent
Chen et al.

(10) Patent No.: US 11,876,341 B1
(45) Date of Patent: Jan. 16, 2024

(54) THIN-DISK REGENERATIVE AMPLIFIER AND AMPLIFICATION METHOD

(71) Applicant: Changchun Institute of Optics, Fine Mechanics and Physics, Chinese Academy of Sciences, Changchun (CN)

(72) Inventors: Fei Chen, Changchun (CN); Yi Chen, Changchun (CN); Junjie Sun, Changchun (CN); Jinghua Yu, Changchun (CN); Zhihuan Yao, Changchun (CN); Yang He, Changchun (CN); Kuo Zhang, Changchun (CN); Deyang Yu, Changchun (CN)

(73) Assignee: Changchun Institute of Optics, Fine Mechanics and Physics, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/366,497

(22) Filed: Aug. 7, 2023

(30) Foreign Application Priority Data

Oct. 18, 2022 (CN) .......................... 202211269495.9

(51) Int. Cl.
*H01S 5/00* (2006.01)
*H01S 3/23* (2006.01)
*H01S 3/06* (2006.01)
*H01S 3/08* (2023.01)
*H01S 3/107* (2006.01)
*H01S 3/00* (2006.01)
*H01S 3/10* (2006.01)

(52) U.S. Cl.
CPC ............ *H01S 3/235* (2013.01); *H01S 3/0604* (2013.01); *H01S 3/08059* (2013.01); *H01S 3/0064* (2013.01); *H01S 3/107* (2013.01); *H01S 3/10053* (2013.01); *H01S 3/10061* (2013.01); *H01S 3/10084* (2013.01)

(58) Field of Classification Search
CPC .... H01S 3/235; H01S 3/0604; H01S 3/08059; H01S 3/0064; H01S 3/10053; H01S 3/10061; H01S 3/10084; H01S 3/107
See application file for complete search history.

(56) References Cited

U.S. PATENT DOCUMENTS 7,016,107 B2 * 3/2006 Kafka ...................... H01S 3/235
372/98
2002/0085608 A1 * 7/2002 Kopf ................... H01S 3/09415
372/75

(Continued)

*Primary Examiner* — Kinam Park
(74) *Attorney, Agent, or Firm* — Westbridge IP LLC

(57) ABSTRACT

Disclosed are a thin-disk regenerative amplifier and an amplification method. The thin-disk regenerative amplifier includes an input and output light path and an amplification light path. A seed laser is input into the thin-disk regenerative amplifier through the input and output light path, and reflected and amplified by the amplification optical path to obtain an amplified laser. After reaching a predetermined threshold, the amplified laser is output through the input and output light path. The input and output optical path includes an optical isolator, a first polarization beam splitter, an optical rotator, a second polarization beam splitter, a first reflective mirror, and a second reflective mirror. The amplification light path includes an input mirror, a thin-disk crystal, a pumping device, a first concave reflective mirror, and a second concave reflective mirror.

7 Claims, 3 Drawing Sheets

(56) References Cited

U.S. PATENT DOCUMENTS

| | | | |
|---|---|---|---|
| 2006/0153257 A1* | 7/2006 | Franjic | H01S 3/042 |
| | | | 372/34 |
| 2012/0212804 A1* | 8/2012 | Sarkisyan | H01S 3/2325 |
| | | | 359/347 |
| 2013/0301117 A1* | 11/2013 | Zapata | H01S 3/06 |
| | | | 359/342 |
| 2018/0226766 A1* | 8/2018 | Kirchner | H01S 3/0407 |
| 2018/0309258 A1* | 10/2018 | Honninger | H01S 3/10015 |
| 2019/0067897 A1* | 2/2019 | Starodoumov | H01S 3/235 |

* cited by examiner

THIN-DISK REGENERATIVE AMPLIFIER AND AMPLIFICATION METHOD

CROSS-REFERENCE TO RELATED APPLICATIONS

This application claims priority to Chinese Patent Application No. 202211269495.9, filed on Oct. 18, 2022, the content of which is incorporated herein by reference in its entirety.

TECHNICAL FIELD

The present disclosure relates to a field of laser technology, in particular to a thin-disk regenerative amplifier and an amplification method.

BACKGROUND

An existing amplifier may only allow a single or few round trips of a seed laser. Since a single gain is small, that is, a gain obtained by a single round trip of the seed laser in a cavity is small, it is sensitive to a loss introduced by a transmittance and reflectivity of a component in the cavity. When the gain is less than the loss, a laser energy may not be effectively amplified.

SUMMARY

In order to solve the above-mentioned problems, the present disclosure provides a thin-disk regenerative amplifier with a novel structure, which includes an input and output optical path and an amplification optical path.

A seed laser is input into the thin-disk regenerative amplifier through the input and output optical path, and reflected and amplified by the amplification optical path to obtain an amplified laser. The amplified laser is output through the input and output optical path after reaching a predetermined threshold.

The input and output optical path includes an optical isolator, a first polarization beam splitter, an optical rotator, a second polarization beam splitter, a first reflective mirror, and a second reflective mirror.

The amplification optical path includes an input mirror, a thin-disk crystal, a pumping device, a first concave reflective mirror and a second concave reflective mirror. The pumping device is configured to provide pumping light for the thin-disk crystal.

Preferably, the thin-disk regenerative amplifier further includes a control optical path arranged between the input and output optical path and the amplification optical path. The control optical path is configured to control a number of round trips of the seed laser in the amplification optical path, so that the amplified laser reaches the predetermined threshold.

Preferably, the control optical path includes a quarter-wave plate, a Pockels cell, and a first plane reflective mirror.

Preferably, a distance between the thin-disk crystal and the first concave reflective mirror is $d_1$, a distance between the first concave reflective mirror and the second concave reflective mirror is $d_2$, a focal length of the first concave reflective mirror is $f_1$, a focal length of the second concave reflective mirror is $f_2$, and a relationship between $d_1$, $d_2$, $f_1$ and $f_2$ includes:

$$d_1 = (f_1^2 + 2f_1 f_2)/(2f_2)$$
$$d_2 = f_1 + 2f_2$$
$$\frac{1}{f_1} = \frac{1}{d_1} + \frac{1}{d_2}$$

Preferably, a number of times that the seed laser passes through the thin-disk crystal in a single round trip in the amplification optical path meets a relationship of $4\times(r-r_{\_beam})/l$, where r represents a radius of the first concave reflective mirror and a radius of the second concave reflective mirror, $r_{\_beam}$ represents a spot radius of the seed laser at the first concave reflective mirror and the second concave reflective mirror, and l represents an offset distance of each incidence of the seed laser on the first concave reflective mirror and the second concave reflective mirror.

Preferably, the thin-disk regenerative amplifier further includes a second plane reflective mirror arranged behind the second concave reflective mirror.

Preferably, the focal length of the first concave reflective mirror and the focal length of the second concave reflective mirror are f, the distance between the thin-disk crystal and the first concave reflective mirror is f, a distance between the second plane reflective mirror and the second concave reflective mirror is f, and the distance between the first concave reflective mirror and the second concave reflective mirror is 2f.

Preferably, the thin-disk regenerative amplifier further includes a convex reflective mirror arranged between the input and output optical path and the amplification optical path, the convex reflective mirror has a diameter greater than or equal to 10 mm and a focal length greater than or equal to 10 mm, and the convex reflective mirror is configured to expand a divergence angle of the seed laser.

Preferably, the first reflective mirror and the second reflective mirror are 34-degree total reflection mirrors, and a diameter of the first reflective mirror and a diameter of the second reflective mirror are greater than or equal to 10 mm.

The present disclosure further provides an amplification method performed by using the above-mentioned thin-disk regenerative amplifier, including the following steps:

step S1 in which a seed laser passes through the optical isolator, the first polarization beam splitter, the optical rotator and the second polarization beam splitter in sequence, where the seed laser is a horizontally polarized laser;

step S2 in which the seed laser passing through the second polarization beam splitter enters the quarter-wave plate and enters the Pockels cell, where the quarter-wave plate causes a phase delay of π/4 of the seed laser, so that the seed laser changes from the horizontally polarized laser to a circularly polarized laser, and no voltage is applied by the Pockels cell, so that the seed laser passes through the Pockels cell and is incident on the first plane reflective mirror;

step S3 in which the seed laser is reflected by the first plane reflective mirror and passes through the Pockels cell and the quarter-wave plate again, where the quarter-wave plate causes a phase delay of π/4 of the seed laser, so that the seed laser changes from the circularly polarized laser to a vertically polarized laser, and a quarter-wave voltage is applied by the Pockels cell;

step S4 in which the seed laser is incident on the second polarization beam splitter and reflected by the second polarization beam splitter to the first reflective mirror, reflected by the first reflective mirror to the thin-disk crystal, and passes through the thin-disk crystal to obtain an amplified laser; the amplified laser is reflected by the thin-disk crystal to the first concave reflective mirror, the second concave reflective mirror and the second plane reflective mirror, and is returned to the second polarization beam splitter after a plurality of round-trip propagations between the thin-disk crystal, the first concave reflective mirror, the second concave reflective mirror and the second plane reflective mirror;

step S5 in which the amplified laser is reflected by the second polarization beam splitter to the quarter-wave plate and the Pockels cell and is returned back by the first plane reflective mirror, the amplified laser continues to pass through the Pockels cell and the quarter wave plate and is incident on the second polarization beam splitter, and the amplified laser continues to be reflected by the second polarization beam splitter to the thin-disk crystal to perform a repeated amplification; and step S6 in which the quarter-wave voltage applied by the Pockels cell is turned off in response to the amplified laser reaching a predetermined threshold, so that the amplified laser is output from the second reflective mirror.

In the thin-disk regenerative amplifier and the amplification method of the present disclosure, the number of times that the seed laser may pass through the thin-disk crystal in a single round trip in the amplifier is $4\times(r\text{-}r_{beam})/l$, while the number of times that the seed laser passes through a crystal in a single round trip in a traditional amplifier is 2. A small-signal gain is approximately proportional to a length of passing through a gain medium. Therefore, the small-signal gain of the thin-disk regenerative amplifier of the present disclosure is $2\times(r\text{-}r_{beam})/l$ times that of the traditional amplifier. That is, a single gain of the thin-disk regenerative amplifier of the present disclosure is several times the gain of the existing thin-disk regenerative amplifier, and it is not sensitive to the loss introduced by the transmittance and reflectivity of the component in the cavity, so that the laser energy may be amplified more effectively.

DETAILED DESCRIPTION OF THE EMBODIMENTS

In order to make objectives, technical solutions and advantages of the present disclosure clearer, the present disclosure will be further described in detail below in conjunction with the accompanying drawings and specific embodiments. It should be understood that the specific embodiments described here are only used to explain the present disclosure, but do not constitute a limitation to the present disclosure.

It should be understood that, although the terms "first," "second", "third" and so on may be used for descriptions in the specific embodiments of the present disclosure, those descriptions should not be limited by those terms. Those terms are merely used to distinguish. For example, without departing from the scope of the specific embodiments of the present disclosure, "first" may also be named as "second", and similarly, "second" may also be named as "first".

Figure 1:
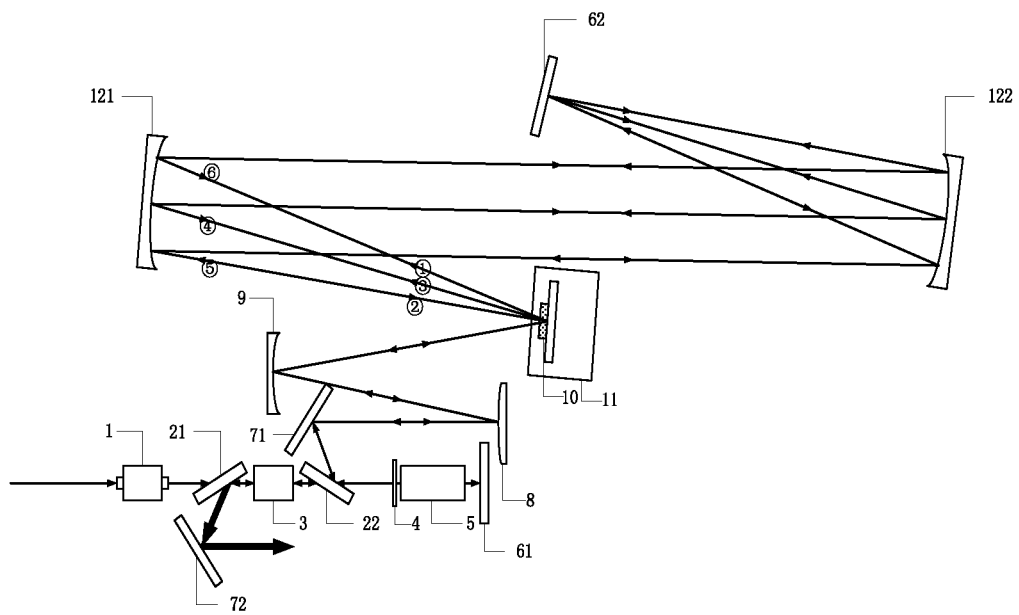
FIG. 1 shows a schematic structural diagram of a thin-disk regenerative amplifier according to a first specific embodiment of the present disclosure.

As shown in FIG. 1, in a first specific embodiment of the present disclosure, a thin-disk regenerative amplifier with a novel structure is provided. The thin-disk regenerative amplifier includes an input and output optical path and an amplification optical path. A seed laser is input into the thin-disk regenerative amplifier through the input and output optical path, and is reflected and amplified by the amplification optical path to obtain an amplified laser. After reaching a predetermined threshold, the amplified laser is output through the input and output optical path.

Specifically, the input and output optical path includes an optical isolator 1, a first polarization beam splitter 21, an optical rotator 3, a second polarization beam splitter 22, a first reflective mirror 71, and a second reflective mirror 72. The amplification optical path includes an input mirror 9, a thin-disk crystal 10, a pumping device 11, a first concave reflective mirror 121, and a second concave reflective mirror 122. The pumping device 11 is used to provide pump light for the thin-disk crystal 10.

In this specific embodiment, the optical isolator 1 may be a Faraday isolator with a clear aperture greater than or equal to 1 mm, which is used to allow light to pass through in one direction, that is, the seed laser (such as polarized light with a wavelength of 1030 nm) may pass in one direction from left to right, but may not pass from right to left, so as to avoid interference with an optical path signal. A diameter of the first polarization beam splitter 21 and a diameter of the second polarization beam splitter 22 are greater than or equal to 10 mm. The first polarization beam splitter 21 and the second polarization beam splitter 22 may both have a high transparency for a laser with a horizontal polarization and a high reflection for a laser with a vertical polarization. In an embodiment, the first polarization beam splitter 21 and the second polarization beam splitter 22 are both 56-degree polarization beam splitters, and an angle between the incident seed laser and a normal line of the first polarization beam splitter 21 and an angle between the incident seed laser and a normal line of the second polarization beam splitter 22 may be 56 degrees, so as to improve a utilization rate of the incident light. In other embodiments, the first polarization beam splitter 21 and the second polarization beam splitter 22 may be both 45-degree polarization beam splitters, or may be a 45-degree polarization beam splitter and a 56-degree polarization beam splitter used in cooperation, which is not particularly limited here.

In this specific embodiment, the optical rotator 3 may be a Faraday optical rotator with a clear aperture greater than or equal to 1 mm. The optical rotator 3 functions to maintain a polarization state of a horizontally polarized laser transmitted from left to right, while changing a polarization state of a horizontally polarized laser transmitted from right to left to a vertical polarization. Specifically, the first reflective mirror 71 and the second reflective mirror 72 may be both 34-degree total reflection mirrors, with diameters greater than or equal to 10 mm. That is, the first reflective mirror 71 and the second reflective mirror 72 are both configured to perform a total reflection on a 34-degree incident laser, while reflecting the seed laser.

In a further preferred embodiment, the thin-disk regenerative amplifier further includes a control optical path arranged between the input and output optical path and the amplification optical path. The control optical path is used to control a number of round trips of the seed laser in the amplification optical path, so that the amplified laser reaches the predetermined threshold. Specifically, as shown in FIG.

1, the control optical path includes a quarter-wave plate 4, a Pockels cell 5, and a first plane reflective mirror 61. The Pockels cell 5 has a clear aperture greater than or equal to 1 mm. No voltage is applied by the Pockels cell 5 during a first round trip of the seed laser in the control optical path. Thereafter, a voltage is always applied by the Pockels cell 5 to cause a plurality of round trips of the seed laser in the amplification optical path. When the amplified laser reaches the predetermined threshold, the voltage of the Pockels cell 5 is turned off, and the amplified laser is output from the input and output optical path. The quarter-wave plate 4 has a clear aperture greater than equal to 1 mm, and may provide a phase difference of $\pi/4$ for the transmitted laser. The Pockels cell 5 has a clear aperture greater than or equal to 1 mm, and when a quarter-wave voltage is applied by the Pockels cell 5, the Pockels cell 5 is equivalent to a quarter-wave plate, that is, the transmitted laser may have a phase change of $\pi/4$. Both the first plane reflective mirror 61 and the second plane reflective mirror 62 may be 0-degree reflective mirrors with diameters greater than or equal to 10 mm, which specifically function to perform a total reflection on a 0-degree incident laser.

As shown in FIG. 1, in this specific embodiment, the thin-disk regenerative amplifier further includes a second plane reflective mirror 62 arranged behind the second concave reflective mirror 122. The focal length of the first concave reflective mirror 121 and the focal length of the second concave reflective mirror 122 are both f, a distance between the thin-disk crystal 10 and the first concave reflective mirror 121 is f, a distance between the second plane reflective mirror 62 and the second concave reflective mirror 122 is f, and a distance between the first concave reflective mirror 121 and the second concave reflective mirror 122 is 2f. The first concave reflective mirror 121 and the second concave reflective mirror 122 both have diameters greater than or equal to 10 mm and focal lengths greater than or equal to 10 mm. A divergence angle of the incident laser may be reduced, while the seed laser may be reflected.

In this specific embodiment, a number of times that the seed laser passes through the thin-disk crystal in a single round trip in the amplification optical path meets a relationship of $4\times(r-r_{beam})/l$, where r represents a radius of the first concave reflective mirror 121 and a radius of the second concave reflective mirror 122, $r_{beam}$ represents a spot radius of the seed laser at the first concave reflective mirror 121 and the second concave reflective mirror 122, and l represents an offset distance of each incidence of the seed laser on the first concave reflective mirror 121 and the second concave reflective mirror 122. That is, the first concave reflective mirror 121 and the second concave reflective mirror 122 have the same radius, the seed laser has the same spot radius at the first concave reflective mirror 121 and the second concave reflective mirror 122, and each incidence of the seed laser has the same offset distance at the first concave reflective mirror 121 and the second concave reflective mirror 122.

As shown in FIG. 1, in this specific embodiment, the thin-disk regenerative amplifier further includes a convex reflective mirror 8 arranged between the input and output optical path and the amplification optical path. The convex reflective mirror 8 has a diameter greater than or equal to 10 mm and a focal length greater than or equal to 10 mm, and is used to expand the divergence angle of the seed laser, so as to increase the light spot of the seed laser. Specifically, input mirror 9 may be a concave reflective mirror, with a diameter greater than or equal to 10 mm and a focal length greater than or equal to 10 mm. The input mirror 9 is used to reduce the divergence angle of the incident seed laser. The convex reflective mirror 8 and the input mirror 9 constitute a spot control system for laser. The laser spot may be expanded to a desired diameter by changing the focal length of the convex reflective mirror 8, the focal length of the input mirror 9 and a distance between the two.

In this specific embodiment, the high-gain thin-disk regenerative amplifier includes a thin-disk crystal 10 and a pumping device 11. The thin-disk crystal 10 is made of Yb:YAG, with a doping concentration of 7% to 20%, a diameter greater than or equal to 10 mm, and a thickness of 100 μm to 300 μm. The thin-disk crystal 10 is mainly used as a laser gain medium to absorb pumping light and provide a gain to the incident seed laser. The pumping device 11 has a pumping wavelength of 940 nm or 969 nm, and mainly functions to emit the pumping light to the thin-disk crystal 10 to provide an energy required by the thin-disk crystal 10.

Referring to FIG. 1, the thin-disk crystal 10 made of Yb:YAG is taken as an example. In this specific embodiment, a working principle of the thin-disk regenerative amplifier is as follows. A horizontally polarized seed laser with a wavelength of 1030 nm and a pulse width less than or equal to 10 ns passes through the optical isolator (Faraday isolator) 1 from left to right, then continues to pass through the first polarization beam splitter 21 and enters the optical rotator (Faraday rotator) 3. The seed laser passes through the Faraday rotator 3 and enters the second polarization splitter sheet 22, and passes through the second polarization beam splitter 22 and enters the quarter-wave plate 4. The quarter-wave plate 4 causes a phase delay of $\pi/4$ of the seed laser, and the seed laser changes from the horizontally polarized laser to a circularly polarized laser. The seed laser passes through the quarter-wave plate 4 and enters the Pockels cell 5. At this time, no voltage is applied to the Pockels cell 5, and the seed laser passes through the Pockels cell 5 and is incident on the first plane reflective mirror (0-degree reflective mirror) 61. The seed laser is reflected by the first plane reflective mirror 61 and passes through the Pockels cell 5, and then passes through the quarter-wave plate 4. The quarter-wave plate 4 causes a phase delay of $\pi/4$ of the seed laser, and the seed laser changes from the circularly polarized laser to a vertically polarized laser. At this time, a quarter-wave voltage is applied by the Pockels cell 5. The seed laser is incident on the second polarization beam splitter 22, and is reflected by the polarization beam splitter 22 to the first reflective mirror (first 34-degree reflective mirror) 71. The seed laser continues to be reflected by the first 34-degree reflective mirror 71 to the convex reflective mirror 8, reflected by the convex reflective mirror 8 to the input mirror (concave reflective mirror) 9, and reflected by the input mirror 9 to the thin-disk crystal 10. The seed laser passes through the thin-disk crystal 10, and the energy of the seed laser is amplified through an action of stimulated radiation. The seed laser is then reflected by the thin-disk crystal 10 to the first concave reflective mirror 121. After that, the amplified seed laser is called an amplified laser. The amplified laser is reflected by the first concave reflective mirror 121 to the second concave reflective mirror 122, and continues to be reflected by the second concave reflective mirror 122 to the 0-degree reflective mirror 62. Then, the amplified laser propagates back and force multiple times between the thin-disk crystal 10, the first concave reflective mirror 121, the second concave reflective mirror 122 and the second plane reflective mirror (0-degree reflective mirror) 62 along optical paths ①②③④⑤⑥ in the figure (only an example is shown in the figure, and the number of round trips may be increased). The amplified laser is incident on the thin-disk crystal 10 along the optical path ⑥, and is reflected by the thin-disk crystal 10 to the input mirror 9. The amplified laser continues to be reflected by the input mirror 9 to the convex reflective mirror 8, reflected by the convex reflective mirror 8 to the first 34-degree reflective mirror 71, and further reflected to the second polarization beam splitter 22. The amplified laser is reflected by the second polarization beam splitter 22 to the quarter-wave plate 4 and the Pockels cell 5, and is returned back by the first plane reflective mirror (0-degree reflective mirror) 61. Then, the amplified laser continues to pass through the Pockels cell 5 and the quarter-wave plate 4, and is incident on the second polarization beam splitter 22. In this process, the amplified laser passes through the quarter-wave plate 4 and the Pockels cell 5 twice, with a phase variation of π, so that the polarization state of the amplified laser is maintained as the vertical polarization. The laser continues to be reflected by the second polarization beam splitter 22 to the first 34-degree reflective mirror 71. The above steps are repeatedly performed until the amplified laser is amplified to a sufficient energy. Then, the Pockels cell 5 does not apply the quarter-wave voltage. When the amplified laser passes through the quarter-wave plate 4 and the Pockels cell 5 from left to right and is returned back to the second polarization beam splitter 22 by the first plane reflective mirror 61, the phase delay of the amplified laser is π/2, so that the polarization state of the amplified laser changes from the vertical polarization to a horizontal polarization. The horizontally polarized amplified laser passes through the second polarization beam splitter 22 and is incident on the Faraday rotator 3. The amplified laser passes through the Faraday rotator 3, with a change of the polarization state from the horizontal polarization to the vertical polarization, and is incident on the first polarization beam splitter 21. The amplified laser is reflected by the first polarization beam splitter 21 to the second reflective mirror (second 34-degree reflective mirror) 72, and is reflected and output by the second 34-degree reflective mirror 72.

In the thin-disk regenerative amplifier of the present disclosure, the number of times that the seed laser may pass through the thin-disk crystal in a single round trip in the amplifier is $4\times(r-r_{\_beam})/l$, while the number of times that the seed laser passes through a crystal in a single round trip in a traditional amplifier is 2. A small-signal gain is approximately proportional to a length of passing through a gain medium. Therefore, the small-signal gain of the thin-disk regenerative amplifier of the present disclosure is $2\times(r-r_{\_beam})/l$ times that of the traditional amplifier. That is, a single gain of the thin-disk regenerative amplifier of the present disclosure is several times the gain of the existing thin-disk regenerative amplifier, and it is not sensitive to the loss introduced by the transmittance and reflectivity of the component in the cavity, so that the laser energy may be amplified more effectively.

Figure 3:
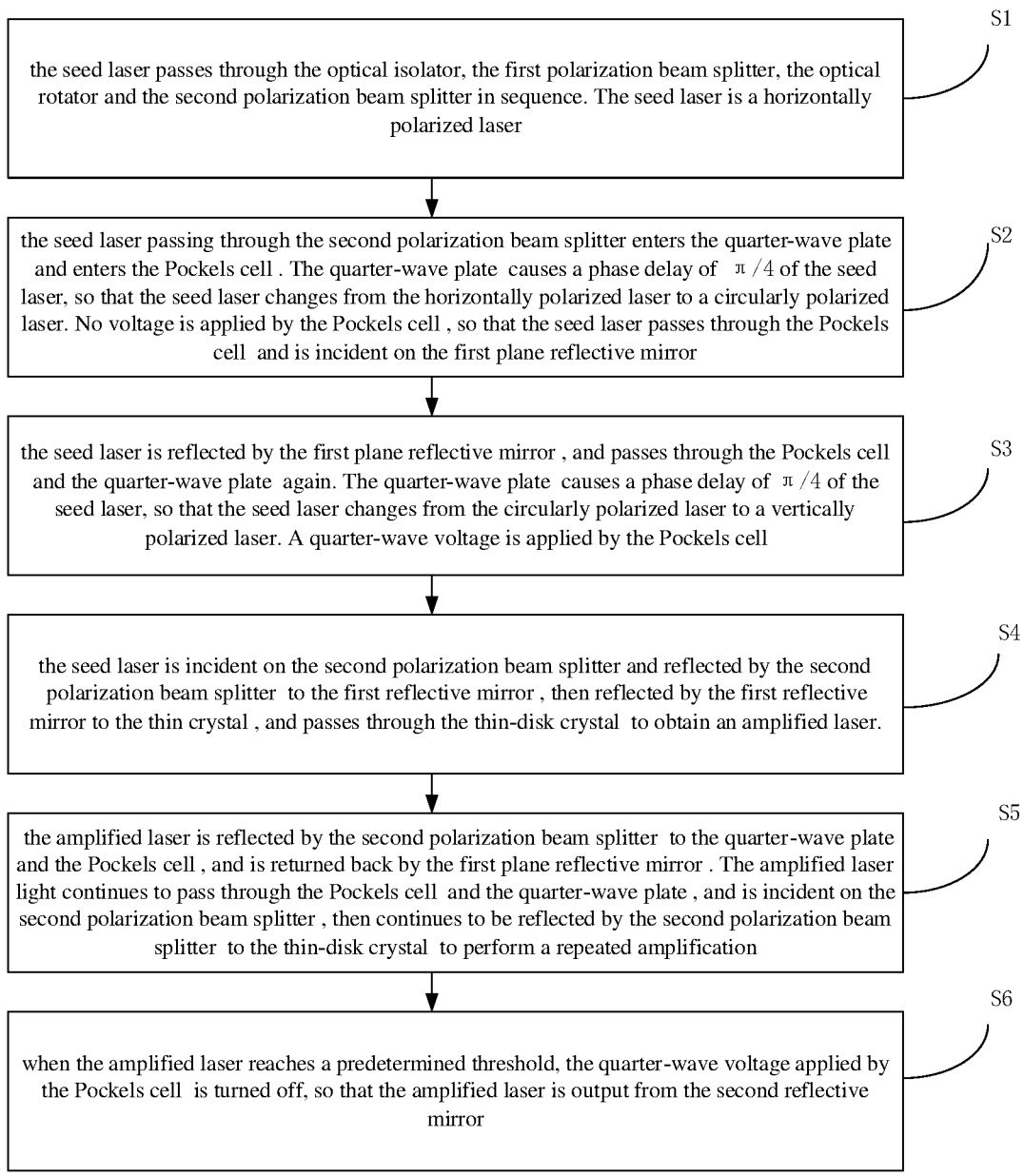
FIG. 3 shows a flowchart of a method according to a first specific embodiment of the present disclosure.

Corresponding to the first specific embodiment, the present disclosure further provides an amplification method performed by using the above-mentioned thin-disk regenerative amplifier. As shown in FIG. 3, the amplification method includes the following steps.

In S1, the seed laser passes through the optical isolator 1, the first polarization beam splitter 21, the optical rotator 3 and the second polarization beam splitter 22 in sequence. The seed laser is a horizontally polarized laser.

In S2, the seed laser passing through the second polarization beam splitter 22 enters the quarter-wave plate 4 and enters the Pockels cell 5. The quarter-wave plate 4 causes a phase delay of π/4 of the seed laser, so that the seed laser changes from the horizontally polarized laser to a circularly polarized laser. No voltage is applied by the Pockels cell 5, so that the seed laser passes through the Pockels cell 5 and is incident on the first plane reflective mirror 61.

In S3, the seed laser is reflected by the first plane reflective mirror 61, and passes through the Pockels cell 5 and the quarter-wave plate 4 again. The quarter-wave plate 4 causes a phase delay of π/4 of the seed laser, so that the seed laser changes from the circularly polarized laser to a vertically polarized laser. A quarter-wave voltage is applied by the Pockels cell 5.

In S4, the seed laser is incident on the second polarization beam splitter 22 and reflected by the second polarization beam splitter 22 to the first reflective mirror 71, then reflected by the first reflective mirror 71 to the thin crystal 10, and passes through the thin-disk crystal 10 to obtain an amplified laser.

The amplified laser is reflected by the thin-disk crystal 10 to the first concave reflective mirror 121, the second concave reflective mirror 122, and the second plane reflective mirror 62. After a plurality of round-trip propagations between the thin-disk crystal 10, the first concave reflective mirror 121, the second concave reflective mirror 122, and the second plane reflective mirror 62, the amplified laser is returned back to the second polarization beam splitter 22. Preferably, the plurality of round-trip propagations refers to three or more round-trip propagations.

In S5, the amplified laser is reflected by the second polarization beam splitter 22 to the quarter-wave plate 4 and the Pockels cell 5, and is returned back by the first plane reflective mirror 61. The amplified laser light continues to pass through the Pockels cell 5 and the quarter-wave plate 4, and is incident on the second polarization beam splitter 22, then continues to be reflected by the second polarization beam splitter 22 to the thin-disk crystal 10 to perform a repeated amplification.

In S6, when the amplified laser reaches a predetermined threshold, the quarter-wave voltage applied by the Pockels cell 5 is turned off, so that the amplified laser is output from the second reflective mirror 72.

Figure 2:
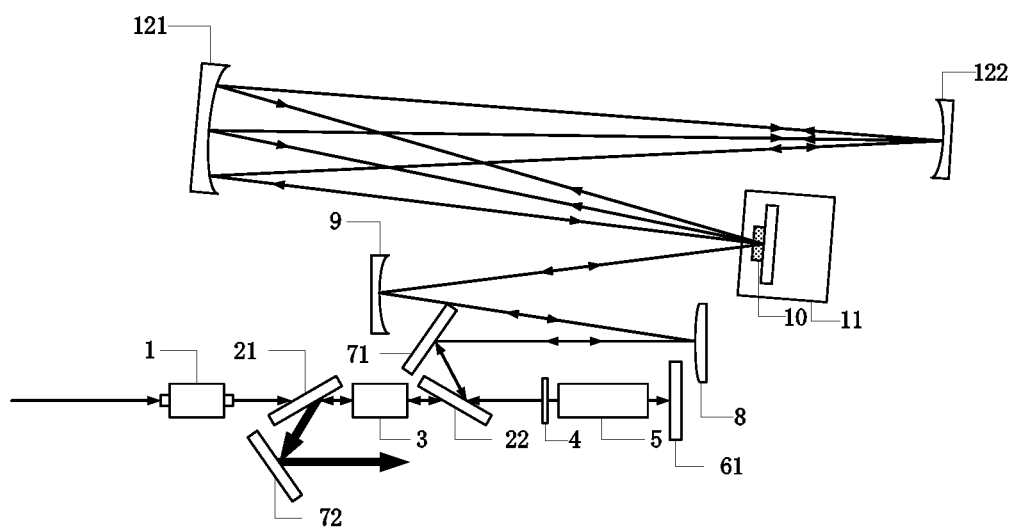
FIG. 2 shows a schematic structural diagram of a thin-disk regenerative amplifier according to a second specific embodiment of the present disclosure.

As shown in FIG. 2, a second embodiment of the present disclosure provides another high-gain thin-disk regenerative amplifier, in which elements substantially the same as the first specific embodiment have the same parameters and functions, and details will not be repeated in this embodiment. In this specific embodiment, the thin-disk regenerative amplifier includes an input and output optical path and an amplification optical path. The input and output optical path includes an optical isolator 1, a first polarization beam splitter 21, an optical rotator 3, a second polarization beam splitter 22, a first reflective mirror 71 and a second reflective mirror 72 arranged in sequence along an optical path direction. The input and output optical path is configured such that the seed laser is input to the amplifier through the optical isolator 1, then amplified to form an amplified laser, and output from the second reflective mirror 72. The amplification optical path includes an input mirror 9, a thin-disk crystal 10, a pumping device 11, a first concave reflective mirror 121 and a second concave reflective mirror 122 arranged in sequence along an optical path direction. The amplification optical path is configured to receive the seed laser input from the input and output optical path, reflect and amplify the seed laser multiple times in the amplification optical path, and output an obtained amplified laser from the input and output optical path after the amplified laser reaches a predetermined threshold. Preferably, reflecting and amplifying multiple times refers to reflecting and amplifying three or more times.

In this specific embodiment, a distance between the thin-disk crystal 10 and the first concave reflective mirror 121 is $d_1$, a distance between the first concave reflective mirror 121 and the second concave reflective mirror 122 is $d_2$, a focal length of the first concave reflective mirror 121 is $f_1$, and a focal length of the second concave reflective mirror 122 is $f_2$. The above-mentioned parameters have the following relationships:

$$d_1 = (f_1^2 + 2f_1f_2)/(2f_2)$$
$$d_2 = f_1 + 2f_2$$
$$\frac{1}{f_1} = \frac{1}{d_1} + \frac{1}{d_2}$$

Compared with the thin-disk regenerative amplifier in the first specific embodiment, in the thin-disk regenerative amplifier provided in this specific embodiment, the components in the amplification optical path are reduced, and an overall size of the amplifier is reduced, so that the amplifier has a more compact structure. In addition, due to a reduction of the optical path, an amplification efficiency is improved, and a cost of the amplifier is saved.

Figure 4:
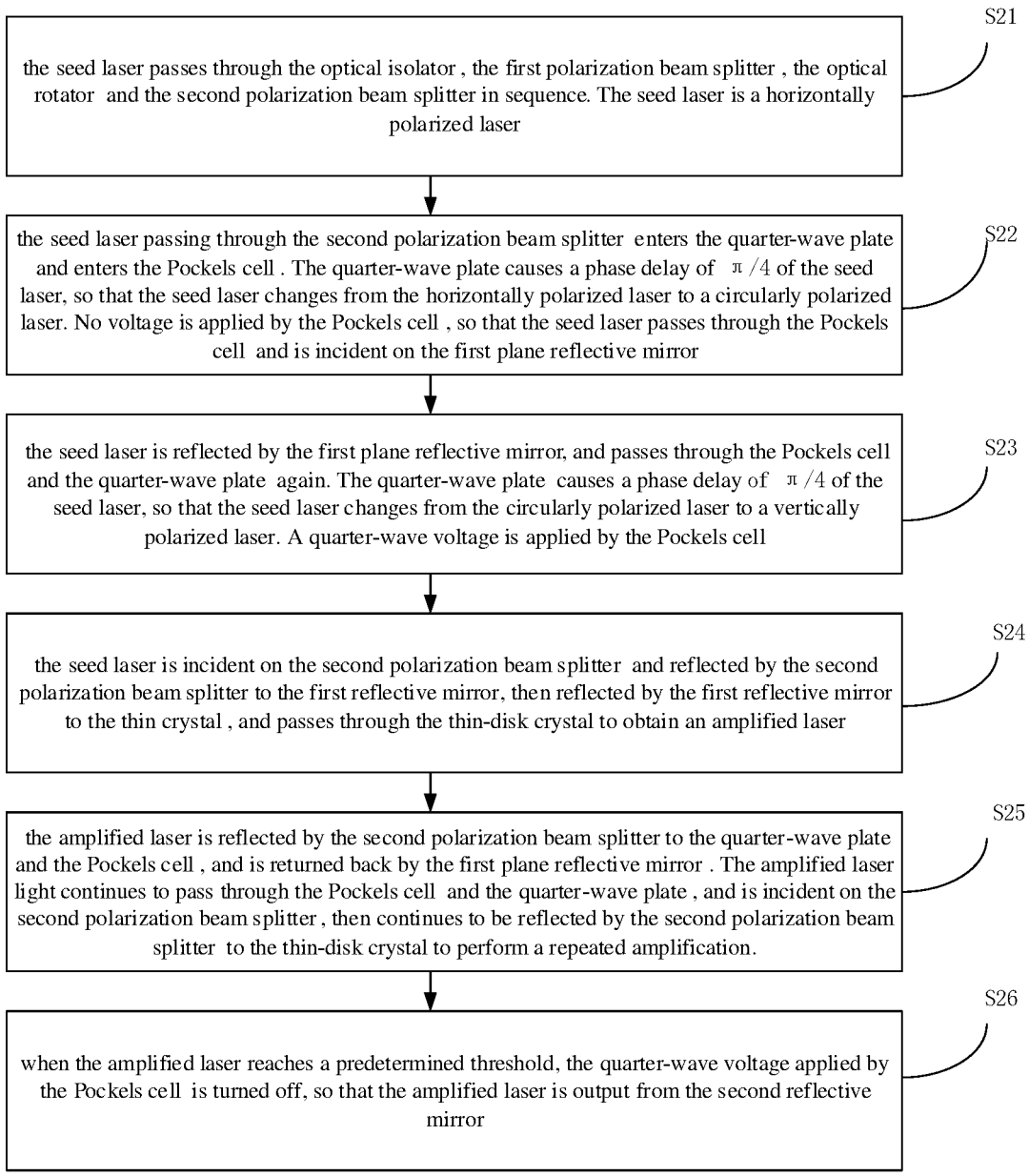
FIG. 4 shows a flowchart of a method according to a second specific embodiment of the present disclosure.

Corresponding to the second specific embodiment, the present disclosure further provides another amplification method performed by using the above-mentioned thin-disk regenerative amplifier. As shown in FIG. 4, the amplification method includes the following steps.

In S21, the seed laser passes through the optical isolator 1, the first polarization beam splitter 21, the optical rotator 3 and the second polarization beam splitter 22 in sequence. The seed laser is a horizontally polarized laser.

In S22, the seed laser passing through the second polarization beam splitter 22 enters the quarter-wave plate 4 and enters the Pockels cell 5. The quarter-wave plate 4 causes a phase delay of π/4 of the seed laser, so that the seed laser changes from the horizontally polarized laser to a circularly polarized laser. No voltage is applied by the Pockels cell 5, so that the seed laser passes through the Pockels cell 5 and is incident on the first plane reflective mirror 61.

In S23, the seed laser is reflected by the first plane reflective mirror 61, and passes through the Pockels cell 5 and the quarter-wave plate 4 again. The quarter-wave plate 4 causes a phase delay of π/4 of the seed laser, so that the seed laser changes from the circularly polarized laser to a vertically polarized laser. A quarter-wave voltage is applied by the Pockels cell 5.

In S24, the seed laser is incident on the second polarization beam splitter 22 and reflected by the second polarization beam splitter 22 to the first reflective mirror 71, then reflected by the first reflective mirror 71 to the thin crystal 10, and passes through the thin-disk crystal 10 to obtain an amplified laser.

The amplified laser is reflected by the thin-disk crystal 10 to the first concave reflective mirror 121 and the second concave reflective mirror 122. After a plurality of round-trip propagations between the thin-disk crystal 10, the first concave reflective mirror 121 and the second concave reflective mirror 122, the amplified laser is returned back to the second polarization beam splitter 22. Preferably, the plurality of round-trip propagations refers to three or more round-trip propagations.

In S25, the amplified laser is reflected by the second polarization beam splitter 22 to the quarter-wave plate 4 and the Pockels cell 5, and is returned back by the first plane reflective mirror 61. The amplified laser light continues to pass through the Pockels cell 5 and the quarter-wave plate 4, and is incident on the second polarization beam splitter 22, then continues to be reflected by the second polarization beam splitter 22 to the thin-disk crystal 10 to perform a repeated amplification.

In S26, when the amplified laser reaches a predetermined threshold, the quarter-wave voltage applied by the Pockels cell 5 is turned off, so that the amplified laser is output from the second reflective mirror 72.

Although the embodiments of the present disclosure have been illustrated and described above, it should be understood that the above embodiments are exemplary and should not be construed as limiting the present disclosure. Those ordinary skilled in the art may make changes, modifications, substitutions and transformations on the above embodiments within the scope of the present disclosure.

The above specific embodiments of the present disclosure do not constitute a limitation to the protection scope of the present disclosure. Any other corresponding changes and modifications made according to the technical concept of the present disclosure shall be contained in the protection scope of the claims of the present disclosure.

What is claimed is:

1. A thin-disk regenerative amplifier, comprising an input and output optical path and an amplification optical path;
   wherein a seed laser is input into the thin-disk regenerative amplifier through the input and output optical path, and reflected and amplified by the amplification optical path to obtain an amplified laser, and the amplified laser is output through the input and output optical path after an energy level of the amplified laser reaches a predetermined threshold;
   wherein the input and output optical path comprises an optical isolator, a first polarization beam splitter, an optical rotator, a second polarization beam splitter, a first reflective minor, and a second reflective minor;
   wherein the amplification optical path comprises an input minor, a thin-disk crystal, a pumping device, a first concave reflective mirror and a second concave reflective mirror, and the pumping device is configured to provide pumping light for the thin-disk crystal;
   wherein a distance between the thin-disk crystal and the first concave reflective mirror is $d_1$, a distance between the first concave reflective mirror and the second concave reflective minor is $d_2$, a focal length of the first concave reflective mirror is $f_1$, a focal length of the second concave reflective minor is $f_2$, and a relationship between $d_1$, $d_2$, $f_1$ and $f_2$ comprises:

$$d_1 = (f_1^2 + 2f_1f_2)/(2f_2)$$
$$d_2 = f_1 + 2f_2$$
$$\frac{1}{f_1} = \frac{1}{d_1} + \frac{1}{d_2}$$

wherein a number of times that the seed laser passes through the thin-disk crystal in a single round trip in the amplification optical path meets a relationship of 4×(r-$r\_{beam}$)/1, where r represents a radius of the first concave reflective mirror and a radius of the second concave reflective mirror, $r\_{beam}$ represents a spot radius of the seed laser at the first concave reflective mirror and the second concave reflective minor, and l represents an offset distance of each incidence of the seed laser on the first concave reflective minor and the second concave reflective mirror.

2. The thin-disk regenerative amplifier according to claim 1, further comprising a control optical path arranged between the input and output optical path and the amplification optical path, wherein the control optical path is configured to control a number of round trips of the seed laser in the amplification optical path, so that the energy level of the amplified laser reaches the predetermined threshold.

3. The thin-disk regenerative amplifier according to claim 2, wherein the control optical path comprises a quarter-wave plate, a Pockels cell, and a first plane reflective mirror.

4. The thin-disk regenerative amplifier according to claim 1, further comprising a second plane reflective minor arranged behind the second concave reflective mirror.

5. The thin-disk regenerative amplifier according to claim 4, wherein the focal length of the first concave reflective minor and the focal length of the second concave reflective minor are f, the distance between the thin-disk crystal and the first concave reflective mirror is f, a distance between the second plane reflective mirror and the second concave reflective minor is f, and the distance between the first concave reflective mirror and the second concave reflective minor is 2f.

6. The thin-disk regenerative amplifier according to claim 1, further comprising a convex reflective minor arranged between the input and output optical path and the amplification optical path, wherein the convex reflective minor has a diameter greater than or equal to 10 mm and a focal length greater than or equal to 10 mm, and the convex reflective mirror is configured to expand a divergence angle of the seed laser.

7. The thin-disk regenerative amplifier according to claim 1, wherein the first reflective mirror and the second reflective mirror are 34-degree total reflection mirrors, and a diameter of the first reflective mirror and a diameter of the second reflective mirror are greater than or equal to 10 mm.

* * * * *